(12) United States Patent
Edwards et al.

(10) Patent No.: US 11,921,615 B2
(45) Date of Patent: Mar. 5, 2024

(54) COMPUTER-IMPLEMENTED METHODS, COMPUTER-READABLE MEDIA AND ELECTRONIC DEVICES FOR PROCESSING TEST ELECTRONIC TRANSACTIONS

(71) Applicant: Mastercard International Incorporated, Purchase, NY (US)

(72) Inventors: David Scott Edwards, Fenton, MO (US); Darrell E. Louderback, Wentzville, MO (US); Timothy Lewis Barnett, Valley Park, MO (US); Jeremy Glennon Benear, Wentzville, MO (US)

(73) Assignee: Mastercard International Corporation, Purchase, NY (US)

( * ) Notice: Subject to any disclaimer, the term of this patent is extended or adjusted under 35 U.S.C. 154(b) by 340 days.

(21) Appl. No.: 15/850,812

(22) Filed: Dec. 21, 2017

(65) Prior Publication Data
US 2019/0196935 A1    Jun. 27, 2019

(51) Int. Cl.
| | |
|---|---|
| *G06Q 20/32* | (2012.01) |
| *G06F 11/36* | (2006.01) |
| *G06N 20/00* | (2019.01) |
| *G06Q 20/38* | (2012.01) |
| *H04L 9/40* | (2022.01) |

(Continued)

(52) U.S. Cl.
CPC ......... *G06F 11/3612* (2013.01); *G06N 20/00* (2019.01); *G06Q 20/3223* (2013.01); *G06Q 20/326* (2020.05); *G06Q 20/3278* (2013.01); *G06Q 20/3821* (2013.01);
(Continued)

(58) Field of Classification Search
CPC ............. G06F 11/3612; G06F 11/3684; G06F 11/3692; H04L 63/00; H04L 69/02; H04L 67/10; G06N 20/00; G06Q 20/3278; G06Q 20/3223; G06Q 20/3821
See application file for complete search history.

(56) References Cited

U.S. PATENT DOCUMENTS

| | | |
|---|---|---|
| 8,577,766 B2 | 11/2013 | Saban |
| 8,788,281 B1 | 7/2014 | Pletz et al. |

(Continued)

FOREIGN PATENT DOCUMENTS

| | | | | |
|---|---|---|---|---|
| CN | 104094302 A | * | 10/2014 | ........... G06F 21/606 |

OTHER PUBLICATIONS

"EMV Integrated Circuit Card Specifications for Payment Systems, Book 3, Application Specification", Version 4.3, Nov. 2011 (Year: 2011).*

(Continued)

*Primary Examiner* — Duan Zhang
(74) *Attorney, Agent, or Firm* — Hovey Williams LLP

(57) ABSTRACT

A computer-implemented method for processing test financial transactions that includes accessing, via a remote-control server, transaction data corresponding to a test run. The transaction data is transmitted via the remote-control server and received at a mobile application API of an electronic device. The transaction data is passed to a payment application of the electronic device. A cryptogram corresponding to the transaction data is generated via the payment application and transmitted for submission to a payment network. A transaction response corresponding to the test run is received at the remote-control server.

20 Claims, 13 Drawing Sheets

(51) Int. Cl.
*H04L 69/00* (2022.01)
*H04L 67/10* (2022.01)

(52) U.S. Cl.
CPC .............. *H04L 63/00* (2013.01); *H04L 69/02* (2013.01); *H04L 67/10* (2013.01)

(56) References Cited

U.S. PATENT DOCUMENTS

| | | | |
|---|---|---|---|
| 9,148,476 B2* | 9/2015 | Mattsson | H04L 67/10 |
| 9,558,465 B1 | 1/2017 | Arguelles et al. | |
| 9,576,323 B2 | 2/2017 | Yu et al. | |
| 9,934,134 B2* | 4/2018 | Cohen | G06F 11/3684 |
| 10,152,268 B1 | 12/2018 | Chakraborty et al. | |
| 2009/0276344 A1 | 11/2009 | Maw et al. | |
| 2009/0294526 A1* | 12/2009 | Maw | G06K 7/0008 |
| | | | 235/380 |
| 2010/0088207 A1 | 4/2010 | McLaughlin et al. | |
| 2011/0161229 A1 | 6/2011 | Mastrangelo et al. | |
| 2011/0208857 A1 | 8/2011 | Gentile et al. | |
| 2011/0244799 A1* | 10/2011 | Roberts | G06Q 20/327 |
| | | | 455/41.2 |
| 2013/0256403 A1 | 10/2013 | MacKinnon Keith | |
| 2014/0040149 A1 | 2/2014 | Fiske | |
| 2014/0089193 A1 | 3/2014 | Boding et al. | |
| 2014/0173759 A1 | 6/2014 | Essary et al. | |
| 2014/0184819 A1 | 7/2014 | Chartrand | |
| 2014/0298027 A1* | 10/2014 | Roberts | G06Q 20/20 |
| | | | 713/171 |
| 2015/0019443 A1* | 1/2015 | Sheets | G06Q 20/322 |
| | | | 705/71 |
| 2015/0154595 A1 | 6/2015 | Collinge et al. | |
| 2016/0019533 A1 | 1/2016 | Wu et al. | |
| 2016/0078444 A1 | 3/2016 | Tomasofsky et al. | |
| 2016/0140545 A1 | 5/2016 | Flurscheim et al. | |
| 2016/0253651 A1* | 9/2016 | Park | G06Q 20/34 |
| | | | 705/39 |
| 2016/0343100 A1 | 11/2016 | Davenport et al. | |
| 2017/0011394 A1* | 1/2017 | Kumar | H04W 12/041 |
| 2017/0127230 A1* | 5/2017 | Enriquez | H04W 4/44 |
| 2018/0070143 A1 | 3/2018 | Joffe et al. | |
| 2018/0174138 A1 | 6/2018 | Subbarayan et al. | |
| 2018/0268403 A1 | 9/2018 | Guglani | |
| 2019/0095320 A1* | 3/2019 | Biswas | G06F 21/577 |
| 2019/0347189 A1* | 11/2019 | Chen | G06Q 20/341 |

OTHER PUBLICATIONS

Special Interest Group for IIAS Standards (SIGIS), https://www.sig-is.org/ (last visited Sep. 12, 2017).
Office Action dated Dec. 30, 2019 from U.S. Appl. No. 15/850,729 entitled Computer-Implemented Methods, Computer-Readable Media and Electronic Devices for Processing Test Electronic Transactions.
Office Action dated May 13, 2020 from U.S. Appl. No. 15/850,729 entitled Computer-Implemented Methods, Computer-Readable Media and Electronic Devices for Processing Test Electronic Transactions.

* cited by examiner

FIG. 12A

| Data Element | Type, Max Length, Primary | Description |
|---|---|---|
| addSendSeconds | Numeric, 2, No | If present, the amount of time the web service API will wait from the time it receives a request from the requestor (comprising transaction data) before it sends to the payment network. Valid values are 1-60. |
| conversationId | String, 64, Yes | Unique identifier for request as determined by the sender |
| debugLevel | Boolean, 5, No | Returns debug level cryptogram information from when either the DSRP transaction was generated or when the terminal software interacted via a NFC reader. Does not apply to MST. If omitted, only basic terminal or DSRP data will be returned. |
| merchantName | String, 64, No | If not supplied, default of "TEST IN-APP MERCHANT" or the like may be used. |
| NFCreader | String, 64, Yes | Free-form text specifying the name of the NFC reader |
| overrideAcquirerInstitutionId | Numeric String, 6, No | If present, web service API will use this value as the AID (Acquirer Institution ID) |
| overrideDecisionResponse | String, 2, No | If present, this will override the transactionResponse (see below) so the exact desired result will be returned back to the requestor. Example: "30" |
| overrideForwardingInstitutionId | Numeric String, 6, No | If present, web service API will use this value as the FID (Forwarding Institution ID) |
| partialPayment | Boolean, 5, Yes | True indicates partial payment logic and "False" indicates one-time payment logic |
| pointOfSaleEntryMode | Numeric String, 2, Yes | The point of sale entry mode for the transaction in question as defined by the requestor. |
| previousTestCaseId | String, 32, Yes | Test Case identifier as previously executed. If same testCaseId has been used multiple times, the last testCaseId contents will be used. |
| requestorVersion | String, 64, Yes | Free form text of the software version of the originating transaction, whether it's the Terminal API or the Mobile Application API. |
| responseFromNetwork | String, 2, Yes | 2-digit response code from the payment network. E.g., "00" indicates approval, "05" indicates decline, "91" indicates timeout, etc. |
| responseFromTerminal | String, 256, Yes if no responseFromNetwork | Free-form text response from Terminal Software indicating what error occurred where the payment network did not receive the transaction data |
| returnDeviceMetadata | Boolean, 5, No | If present and "True", system-level mobile electronic device information is returned |

FIG. 12B

| Data Element | Type, Max Length, Primary | Description |
|---|---|---|
| tearMagstripe | Boolean, 5, No | Indicates torn transaction emulation for a "MAGNETIC_SECURE_TRANSMISSION" terminalType transaction |
| tearMagstripeTiming | Numeric, 3, Yes if tearMagstripe true, otherwise not present | Number of seconds for the reader to operate before shutting off to emulate torn transaction |
| tearMST | Boolean, 5, No | Flag to indicate the MST reader should be shut off during the transaction to create a torn transaction scenario. |
| tearMSTTiming | Numeric, 5, Yes if tearMST is true, otherwise not present | Number of milliseconds for the reader to operate before shutting off to emulate torn transaction |
| tearNFC | Boolean, 5, No | Indicates torn transaction emulation for a "CHIP" or "CONTACTLESS_MAGSTRIPE" transaction |
| tearNFCTiming | Numeric, 4, Yes if tearNFC true, otherwise not present | Number of milliseconds for the reader to operate before shutting off to emulate torn transaction |
| terminalOverride | Array, N/A, No | See following terminalOverride data elements |
| terminalOverrideParameter | String, 64, No | Identifies terminal configuration parameter to override with a different value. |
| terminalOverrideValue | String, 128, Yes if terminalOverrideParameter is present, otherwise not present | Value to set terminalOverrideParameter |
| terminalPin | Numeric String, 4, No | If terminal configuration is expected to prompt user for a PIN entry, this value will be used. |
| terminalRegion | String, 3, Yes | 3-digit ISO 4217-defined currency code to control any region-specific terminal settings |
| terminalSettings | Array, N/A, Yes | See following terminalSettings data elements |
| terminalSettings - parameterName | String, 256, Yes | Loops through each terminal setting and returns names to requestor for validation of settings or to identify which terminalOverride values need to be changed. Requestor must be able to accept any amount of responses (max 999) within this object. |

FIG. 12C

| Data Element | Type, Max Length, Primary | Description |
|---|---|---|
| terminalSettings - parameterValue | String, 256, Yes | Loops through each terminal setting and returns values to requestor for validation of settings or to identify which terminalOverride values need to be changed. Requestor must be able to accept any amount of responses (max 999) within this object. |
| terminalTrack | Numeric String, 1, Yes if terminalType (2), otherwise excluded | "1" or "2" |
| terminalType | String, 28, Yes | (1)"CHIP", (2)"CONTACTLESS_MAGSTRIPE", OR (3)"MAGNETIC_SECURE_TRANSMISSION" |
| terminalVersion | Numeric String, 10, Yes if terminalType (2), otherwise excluded | "2" or "3" |
| terminalVersion (response format) | String, 16, Yes | Free-form text specifying the terminal software version number |
| testCaseid | String, 32, Yes | Test Case identifier as provided by the sender |
| transactionAmount | Numeric String, 10, Yes | User-defined transaction amount |
| transactionCount | Numeric, 8, Yes | The number of transactions posted for a given user (as determined by Oauth credentials) for a current calendar day, as recorded by the web service API. |
| transactionCurrencyCode | String, 3, Yes | 3-digit ISO 4217-defined currency code |
| transactionData | Arary, N/A, Yes | See following transactionData data elements |
| transactionData - encryptedTransactionData | Hex String, 512k, Yes | Encrypted data block containing the actual raw payload. See encryptedTransactionData section for details on what this looks like unencrypted |
| transactionData & transactionResponse - encryptionKey | Hex String, 512, Yes | One-time key encrypted by the public key |
| transactionData & transactionResponse - hashingAlgorithm | String, 6, Yes | Algorithm used to encrypt the encryptedTransactionData |

FIG. 12D

| Data Element | Type, Max Length, Primary | Description |
|---|---|---|
| transactionData & transactionResponse - initializationVector | Hex String, 32, Yes | Initialization vector used when encrypting the data using the encryptionKey. |
| transactionData & transactionResponse - keyFingerprint | Hex String, 64, Yes | Public key fingerprint used to encrypt the encryptedTransactionData |
| transactionDetail | String, 99999, Yes | Raw dump of generated transaction (DSRP or NFC) data. Note: If debugLevel is true, this output is significantly larger. Output may be terminal cryptographic calculations in raw format |
| transactionInjectDataElement | String, 5, No | Signals data field to be populated by override data element. May be used for invalid test scenarios |
| transactionInjectValue | String, 64, Yes only if TransactionInjectData is present | The override data element signaled by TransactionInjectDataElement |
| transactionReplayTestCaseId | String, 32, Yes | Test Case identifier as provided by the sender. |
| transactionResponse | Array, N/A, Yes | See following transactionResponse data elements |
| transactionResponse - encryptedTransactionResponse | String, 512k, Yes | Encrypted data block containing the actual raw response from the payment network. If overrideDecisionResponse was included in the request, the web service API will adjust the DE 39 value in the raw response data to match what was sent in the request. |
| transactionType | String, 4, Yes | "CHIP" or "UCAF." Specifies the type of in-app transaction format based on expected acquirer capability. Any other value may result in an error response |
| webServiceRequestId | String, 32, Yes | The unique identifier as provided by the web service API to track the web service flow. |
| addRespondSeconds | Numeric, 2, No | If present, the amount of time the web service API will wait from the time it receives the response from the payment network (comprising transaction data) before it sends to requestor. Valid values are 1-60. |

FIG. 12E

| Data Element | Type, Max Length, Primary | Description |
|---|---|---|
| deviceMetadata | Array, N/A, Yes if returnDeviceMetadata is true | See following deviceMetadata data elements |
| deviceMetadata - batteryLevel | Numeric, 3, Yes | Battery percentage remaining at time of capture |
| deviceMetadata - bluetoothStatus | String, 8, Yes | Indicates "Enabled" when Bluetooth is enabled, and "Disabled" when Bluetooth is disabled |
| deviceMetadata - deviceName | String, 20, Yes | The user-configured device name |
| deviceMetadata - ipV4Address | String, 15, Yes | v4 IP address of the device at time of capture |
| deviceMetadata - mobileNetworkType | String, 10, Yes | Depending on connected network type will return "LTE", "LTE+", "2G", "3G", "CDMA", etc. If no mobile network is available, "NONE" will be returned. |
| deviceMetadata - modelNumber | String, 20, Yes | The manufacturer-provided model number for the mobile electronic device |
| deviceMetadata - osType | String, 7, Yes | "Android", "iOS", or "OTHER". |
| deviceMetadata - osVersion | String, 10, Yes | The current high-level operating system version information |
| deviceMetadata - totalMem | String, 2, Yes | In megabytes, how much memory the mobile electronic device has at the time of capture |
| deviceMetadata - totalStorage | String, 2, Yes | In megabytes, how much total storage the device has (physical memory, not inserted memory cards) at the time of capture |
| deviceMetadata - uptime | String, 12, Yes | How long the device has been powered on at the time of capture |
| deviceMetadata - usedMem | String, 2, Yes | In megabytes, how much memory is in use at the time of capture |
| deviceMetadata - usedStorage | String, 2, Yes | In megabytes, how much storage space is used on the device (primary memory, not inserted memory cards) at the time of capture |
| deviceMetadata - wifiStatus | String, 9, Yes | Indicates "Enabled when Wifi is enabled but not connected, "Connected when Wifi is enabled and connected to a valid Wifi network, and |

COMPUTER-IMPLEMENTED METHODS, COMPUTER-READABLE MEDIA AND ELECTRONIC DEVICES FOR PROCESSING TEST ELECTRONIC TRANSACTIONS

FIELD OF THE INVENTION

The present disclosure generally relates to computer-implemented methods, systems comprising computer-readable media, and electronic devices for processing test electronic transactions.

BACKGROUND

Conducting electronic transactions via mobile devices (e.g., smart phones) introduces complexities and potential sources of error into payment processing flows. Variances between payment applications and/or native device software, transaction types, device manufacturers, carriers/network models, device capabilities, geographic locations, and other transaction parameters—plus the myriad versions of each that may be in use at any given time throughout the world—make quality control challenging for entities that process such transactions.

Among the leading quality control concerns is the difficulty of accurately and holistically simulating mobile device transactions for testing purposes. Existing simulation models are limited to particular portions of the transaction process and to particular transaction types. Existing simulation models also rely on the ability of their architects to anticipate, and to properly simulate, each significant contributing factor across nearly limitless combinations of transaction parameters. Such simulations are never perfect or complete, and may be entirely ineffective and/or not worthwhile for testing certain transaction types. To the extent methods other than simulation models can be relied on for testing, it is typically only feasible to complete testing on a fraction of the permutations of significant transaction parameters that should be vetted.

Taking these limitations into account, in many cases quality control may exclusively or mostly rely on real-world deployment, trial-and-error and consumer feedback. Such methods involve increased burden on consumers to identify bugs and errors, and may lead to confusion regarding the technical deficiencies that contribute to such bugs and errors.

This background discussion is intended to provide information related to the present invention which is not necessarily prior art.

BRIEF SUMMARY

Embodiments of the present technology relate to computer-implemented methods, systems comprising computer-readable media, and electronic devices for processing test electronic transactions. The embodiments may provide a more realistic and scalable test environment for processing electronic device-initiated transactions over a payment network.

More particularly, in a first aspect, a computer-implemented method for processing test financial transactions may be provided. The method may include accessing, via a remote-control server, transaction data corresponding to a test run. The transaction data is transmitted via the remote-control server and received at a mobile application API of an electronic device. The transaction data is passed to a payment application of the electronic device. A cryptogram corresponding to the transaction data is generated via the payment application and transmitted for submission to a payment network. A transaction response corresponding to the test run is received at the remote-control server. The method may include additional, less, or alternate actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

Figure 1:
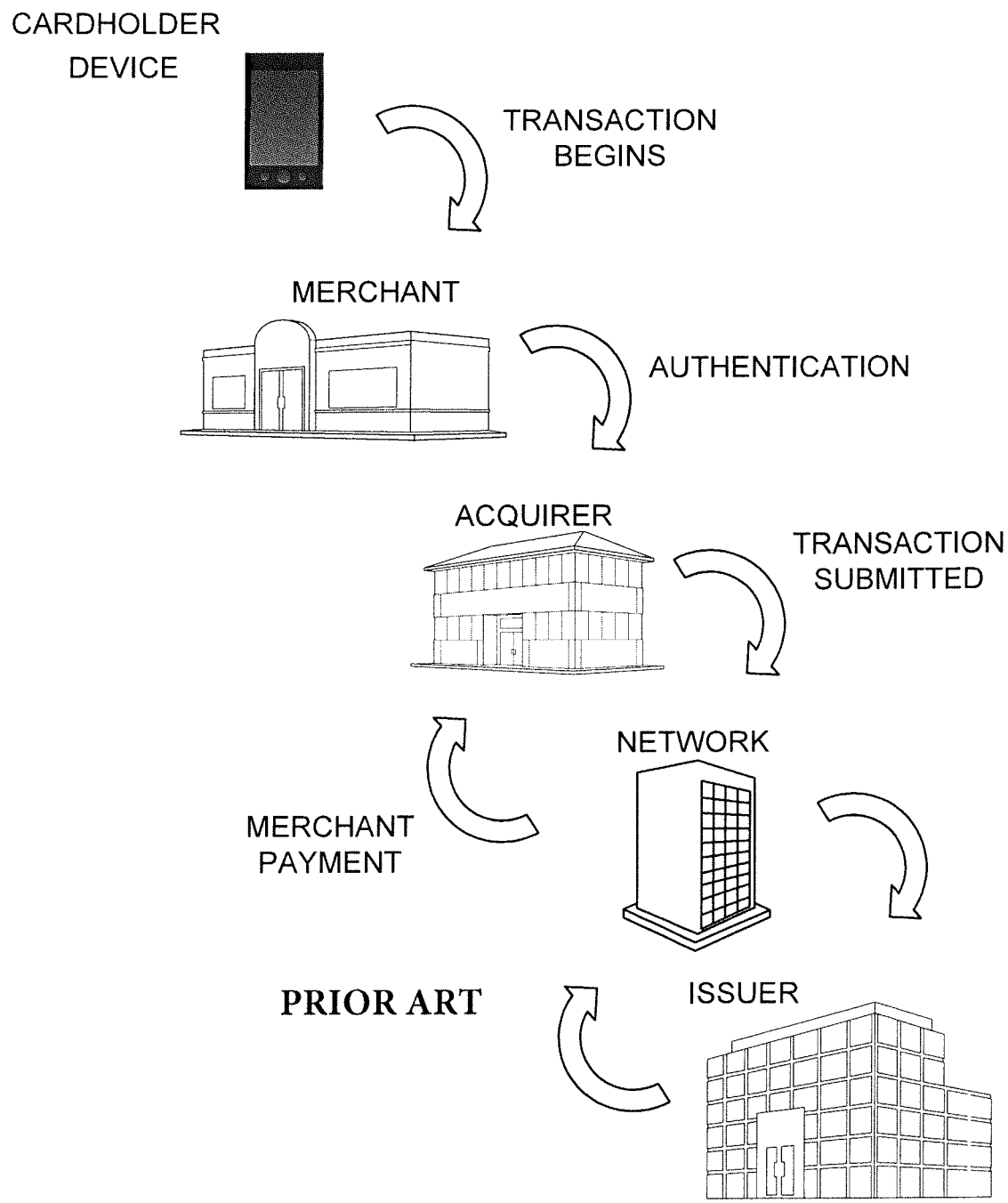
FIG. 1 is a schematic diagram illustrating an existing multi-party transaction card industry system for enabling payment-by-device transactions.

Referring initially to the prior art system of FIG. 1, a typical financial transaction conducted via a cardholder's mobile phone begins with initiation by the cardholder at the mobile phone. The cardholder may, for example, trigger a transaction sequence either via digital secure remote payment (DSRP) software, or by presenting the mobile phone to a payment terminal assembly (POI) in connection with a putative transaction as in short range wireless communication transactions (e.g., near field communications (NFC) and magnetic secure transmission (MST) transactions). The mobile phone and merchant systems exchange information according to standardized protocols to enable completion of the transaction. The merchant sends transaction data to an acquirer, which may include a primary account number (PAN) and expiry date for the card, a bank identification number (BIN), a transaction number and merchant data from the POI. The acquirer routes and submits the transaction data to a payment network for processing via an issuer. Responses from the issuer are generally supplied by the payment network for dissemination in reverse of the order outlined above.

The various technologies and transaction types serviced through standard transaction chains such as the one illustrated in FIG. 1, and the widely variable nature of the transactions themselves, each introduce potential sources of error. For example, an attempted NFC transaction may be pre-empted by a failure to complete the exchange of transaction data between a mobile phone and a POI (e.g., because of a "torn" transaction in which the phone is removed from communication with the POI). For another example, depending on the conveying technology and infrastructure, as well as the amount of system traffic at any given time, an attempted transaction may be declined due to a failure to meet timing and response requirements for the transaction. One of ordinary skill will appreciate that these examples are merely illustrative, and that myriad complexities and sources of error exist within typical mobile device financial transaction chains.

The present embodiments may relate to, inter alia, systems, devices and methods for processing test transactions that provide a more realistic and scalable test environment for processing electronic device-initiated transactions over a payment network. The test environment may be configured to participate in NFC, MST, DSRP and other electronic device-initiated transaction types. The test transactions may be managed in whole or in part by one or more control server(s), which may manage scheduling and processing of test transactions and may participate in results analyses and/or building test protocols. The transaction data of and/or processing parameters for each test transaction may be configurable to emulate real world transactions of many varieties. In this manner, embodiments of the present invention may drastically improve on existing methodologies for processing test transactions by enabling high volume, realistic test transaction processing over a payment network.

Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Exemplary System

Figure 2:
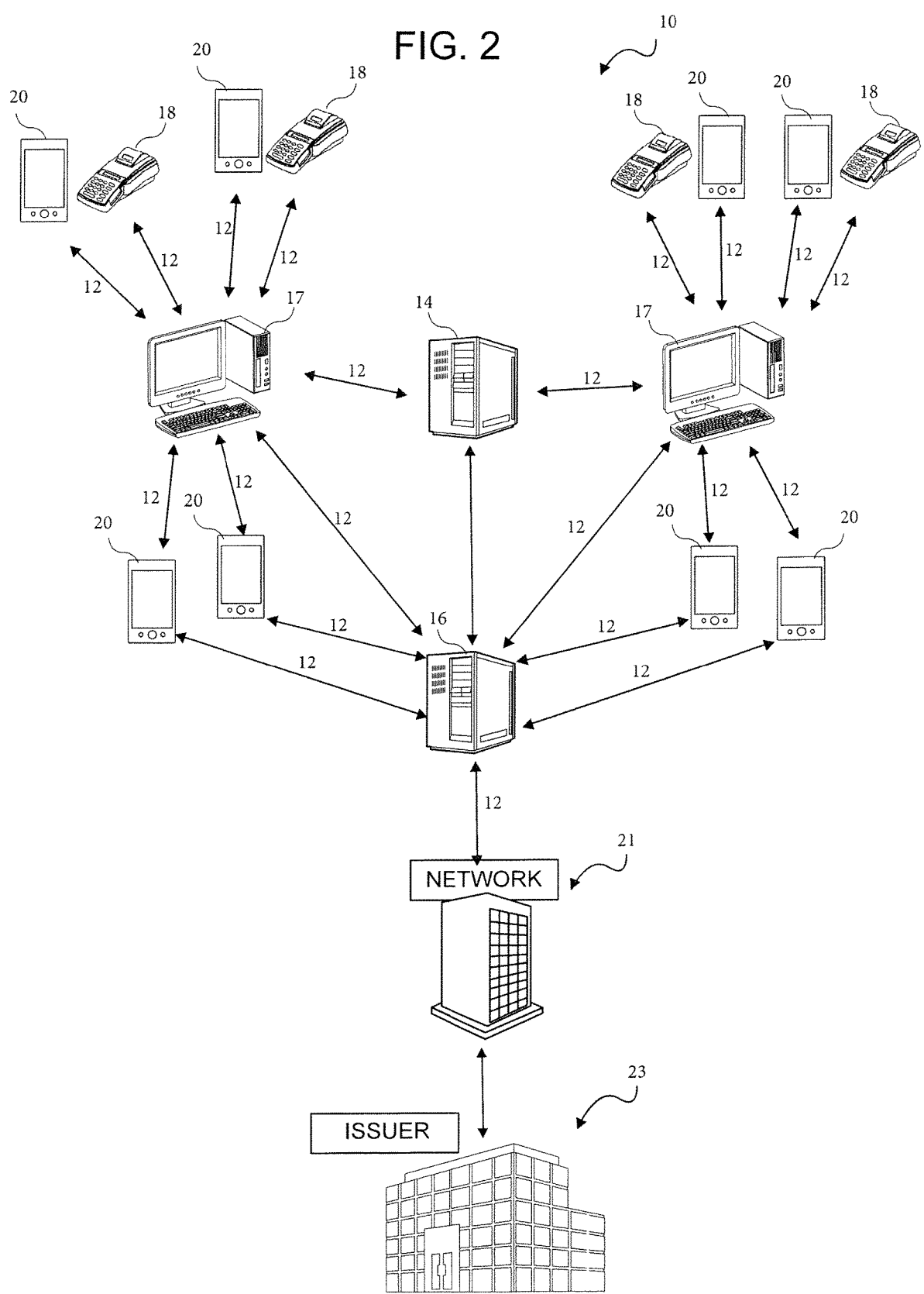
FIG. 2 illustrates various components of an exemplary system for processing test electronic transactions according to embodiments of the present invention in block schematic form.
Figure 3:
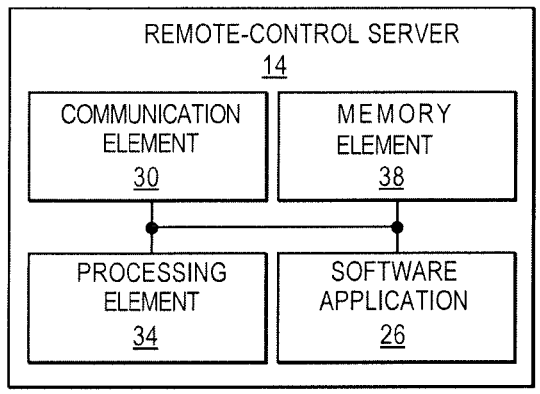
FIGS. 3 and 4 illustrate various components of exemplary servers shown in block schematic form that may be used with the system of FIG. 2.
Figure 4:
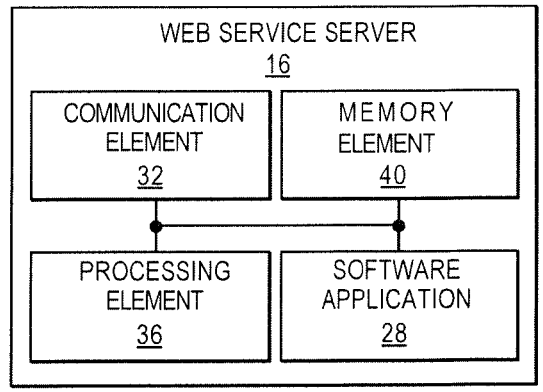

FIG. 2 depicts an exemplary environment in which embodiments of a system 10 may be utilized for processing test transactions. The environment may include communication links 12 for enabling communications between components of the system 10. The system 10 may include a remote-control server 14 and a web service server 16. The remote-control server 14 may issue instructions for the performance of one or more tests to local control computing devices 17. The remote-control server 14 may also provide a user interface for receiving manual input shaping test protocol(s) and/or test run specifications, provide a medium for automated or user-assisted results analyses, and perform other roles in connection with transaction tests according to embodiments of the present invention, as discussed in more detail below.

Each local control computing device 17 may manage test processes performed by one or more terminal assembly(ies) 18 and/or a plurality of mobile electronic devices 20. For example, each local control computing device 17 may periodically or continuously transmit test instructions and/or transaction data received from the remote-control server 14 to the mobile electronic devices 20 and receive transaction responses and/or transaction notifications upon completion of test transactions.

The local control computing devices 17 and/or mobile electronic devices 20 may transmit transaction data to the web service server 16 for processing of each test transaction, as described in more detail below. The web service server 16 may transmit at least a portion of the transaction data, e.g., as part of a transaction request, to a payment network 21. The payment network 21 may process the transaction request with an issuer 23 within existing production and/or test environments according to generally accepted methods. The payment network 21 may also provide a response to the web service server 16. The response or portions thereof may be transmitted by the web service server 16 to the remote-control server 14 and/or corresponding mobile electronic device 20 for analysis. Moreover, in an embodiment the payment network 21 and/or issuer 23 may bypass the web service server 16 to transmit a transaction notification including one or more elements of the transaction data directly to one or both of the corresponding mobile electronic device 20 and the remote-control server 14. Such transaction notifications may be transmitted via one or more communication link(s) (not shown).

Each mobile electronic device 20 may execute a payment application 22 and a mobile application 24, remote-control server 14 may execute a control software application 26, web service server 16 may execute a web service application 28, and each local control computing device may execute a test implementation software application 29.

Broadly, the communication links 12 may allow communication between the mobile electronic devices 20, the local control computing devices 17, the terminal assemblies 18, the servers 14, 16, and the payment network 21. The communication links 12 may include local area networks, metro area networks, wide area networks, cloud networks, the Internet, cellular networks, plain old telephone service (POTS) networks, and the like, or combinations thereof. The communication links 12 may be wired, wireless, or combinations thereof and may include components such as modems, gateways, switches, routers, hubs, access points, repeaters, towers, and the like. For example, the mobile electronic devices 20 and terminal assemblies 18 may generally connect to the communication links 12 wirelessly, such as radio frequency (RF) communication using wireless standards such as cellular 2G, 3G, 4G, or 5G, Institute of Electrical and Electronics Engineers (IEEE) 802.11 standards such as WiFi, IEEE 802.16 standards such as WiMAX, Bluetooth®, or combinations thereof.

Each server 14, 16 generally retains electronic data and may respond to requests to retrieve data as well as to store data. The servers 14, 16 may be embodied by application servers, database servers, file servers, gaming servers, mail servers, print servers, web servers, or the like, or combinations thereof. Furthermore, the servers 14, 16 may include a plurality of servers, virtual servers, or combinations thereof. The servers 14, 16 may be configured to include or execute software such as file storage applications, database applications, email or messaging applications, web server applications, or the like, in addition to and/or in conjunction with software applications 26, 28.

The servers 14, 16 may apply business methods or algorithms, may utilize lookup tables or databases, receive user input via one or more peripheral devices or associated systems, or perform other tasks. The remote-control server 14 may perform such tasks in order to maintain a database of and/or issue test instructions to local control computing devices 17 and/or mobile electronic devices 20, to receive and analyze test results, to configure test protocols and/or transaction data, and to perform other functions. The web service server may perform such tasks in order to act as a secure gateway to receive encrypted transaction data and other associated data, to observe and record certain details regarding each test transaction, to forward test transaction requests to the payment network 21, to encrypt and forward responses from the payment network 21 to mobile electronic devices 20 and/or local control computing devices 17, and to perform other functions in response to, for example, data elements included within transaction data.

The servers 14, 16 may respectively include communication elements 30, 32, processing elements 34, 36, and memory elements 38, 40.

The communication elements 30, 32 generally allow communication with external systems or devices. The communication elements 30, 32 may include signal or data transmitting and receiving circuits, such as antennas, amplifiers, filters, mixers, oscillators, digital signal processors (DSPs), and the like. The communication elements 30, 32 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth™, or combinations thereof. Alternatively, or in addition, the communication elements 30, 32 may establish communication through connectors or couplers that receive metal conductor wires or cables which are compatible with networking technologies such as ethernet. In certain embodiments, the communication elements 30, 32 may also couple with optical fiber cables. The communication elements 30, 32 may be in communication with or electronically coupled to memory elements 38, 40 and/or processing elements 34, 36.

Preferably the devices of the system 10 communicate via secure and/or encrypted communication means. For example, all or some of the remote-control server 14, the mobile electronic devices 20, the local control computing devices 17, and the web service server 16 may utilize Mutual Secure Sockets Layer (MSSL) technology for authenticating and exchanging transmissions. In an embodiment, the MSSL or other secure means for exchanging transaction data enables test transaction processing via the payment network 21—which may help generate authentic test results—in circumstances under which testing would not otherwise be possible or advisable because of the potential risk(s) of permitting access to the payment network 21. In addition, the web service API (discussed below) may implement a client authorization framework—such as OAuth 2.0—for identifying a test transaction request to a particular user or account, granting access to the payment network 21 for processing of the authorized transaction request, and/or tracking a number of test transaction requests processed for a particular user or account. The web service API preferably utilizes enterprise-standard encryption to secure communications.

The memory elements 38, 40 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory elements 38, 40 may include, or may constitute, a "computer-readable medium." The memory elements 38, 40 may store the instructions, code, code segments, software, firmware, programs, applications, apps, services, daemons, or the like that are executed by the processing elements 34, 36. The memory elements 38, 40 may also store settings, data, documents, sound files, photographs, movies, images, databases, and the like.

The processing elements 34, 36 may include processors, microprocessors, microcontrollers, DSPs, field-programmable gate arrays (FPGAs), analog and/or digital application-specific integrated circuits (ASICs), or the like, or combinations thereof. The processing elements 34, 36 may generally execute, process, or run instructions, code, code segments, software, firmware, programs, applications, apps, processes, services, daemons, or the like. The processing elements 34, 36 may also include hardware components, such as finite-state machines, sequential and combinational logic, and other electronic circuits that may perform the functions necessary for the operation of embodiments of the current inventive concept. The processing elements 34, 36 may be in communication with the other electronic components through serial or parallel links that include address busses, data busses, control lines, and the like.

Figure 5:
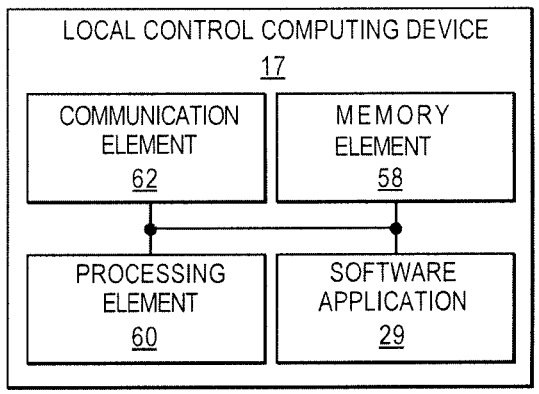
FIG. 5 illustrates various components of an exemplary local control computing device shown in block schematic form that may be used with the system of FIG. 2.
Figure 6:
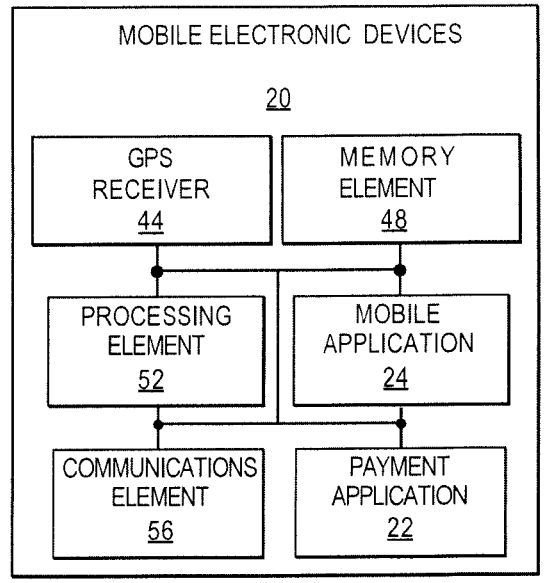
FIG. 6 illustrates various components of exemplary mobile electronic devices shown in block schematic form that may be used with the system of FIG. 2.

A mobile electronic device 20 or local control computing device 17 may be embodied by a smart watch, a smart phone, a personal digital assistant (PDA), a tablet, a palmtop or laptop computer, a notebook, a netbook, smart glasses, wearable and non-wearable electronics (e.g., any IoT device), or other mobile device. Each mobile electronic device 20 may include a GPS receiver element 44, a memory element 48, a processing element 52, software applications 22, 24 and/or a communications element 56, as seen in FIG. 6. The memory element 48 may store the software applications 22, 24, and the processing element 52 may execute the software applications 22, 24. Each local control computing device 17 may include a memory element 58, a processing element 60, software application 29, and/or a communications element 62, as seen in FIG. 5. The memory element 58 may store the software application 29, and the processing element 60 may execute the software applications 29.

The majority of components of each mobile electronic device 20 or local control computing device 17—more specifically, the communications elements 56, 62, processing elements 52, 60, and memory elements 48, 58—may operate and be constructed according to similar principles and with similar components to those set forth above with respect to analogous components of the servers 14, 16. GPS receivers 44 may operate according to known principles for GPS receivers and/or chips common to smartphones, for example.

Terminal assembly(ies) 18 may include a contact terminal, a wireless terminal configured to interface with a wireless device, a magnetic stripe terminal configured to interface with a magnetic stripe device, a combined terminal or other terminals for conducting financial transactions. A combined terminal may be designed to interface with any combination of the aforementioned devices. Some terminals can be contact terminals with plug-in contactless readers. A terminal assembly 18 may include a memory, a processor, and a reader module, with the memory and reader module being coupled to the processor. It should be noted that the principles of construction outlined above are merely exemplary, and terminal assembly(ies) 18 may comprise any known financial transaction reader(s). Further, terminal assembly(ies) 18 may comprise a reader module with memory and/or processor components supporting the reader module residing at the local control computing device(s) 18 without departing from the spirit of the present invention. The reader module may, in general, be configured for contactless communication with a mobile electronic device 20. The terminal assembly(ies) 18 may also be configured for electronic communication with the local control computing device(s) 17.

Test implementation software application 29 may generally initiate (locally) and/or otherwise participate in conducting test runs (as described in more detail below) via the mobile electronic devices 20. For instance, where an NFC or MST transaction is the subject of a test run, the test implementation software application 29 may comprise and/or work in conjunction with a terminal API (discussed below) to manage exchanges between the payment application 22 of a mobile electronic device 20 and a corresponding terminal assembly 18. (See FIG. 7)

Turning now to FIGS. 7-10, exemplary block diagrams are illustrated for processing and replaying test transactions. The exemplary block diagrams include a payment application 702 and several application programming interfaces (APIs). More particularly, the APIs include a mobile application API 704, a terminal API 706 (in coordination with an NFC and/or MST reader such as terminal assembly(ies) 18), and a web service API 708. One or more of the APIs may be configured to transmit, and to receive and respond to, data transmissions and/or queries, and to otherwise participate in the processing of test transactions. For instance, the APIs may be configured to communicate via interchange protocols established by the International Organization for Standardization (ISO) (see discussion elsewhere herein), and to respond to and take action based on the inclusion and values of data elements of the transaction data provided in connection with commands exchanged between devices. Also illustrated are a control server 710 and a payment network 712.

The foregoing components are broadly illustrated as being intermediate between transaction data poles entitled "Cardholder" and "Issuer" for contextualization, though it is foreseen that an actual cardholder and/or issuer may not be present in embodiments of the present invention. For example, the embodiments described herein may begin with instructions issued via control server 710 instead of a cardholder.

Referring also to the system 10 of FIG. 2, the mobile application API 704 may reside on each of the devices 20 and may comprise and/or work in conjunction with the mobile application 24. (See FIG. 6) The payment application 702 of FIGS. 7-10 may reside on each of the devices 20 and may comprise and/or work in conjunction with the payment application 22. (See FIG. 6) The terminal API 706 may reside on each of the local control computing devices 17 and/or terminal assemblies 18, and may comprise and/or work in conjunction with test implementation software application 29. The web service API 708 may reside on the web service server 16 and may comprise and/or work in conjunction with the web service application 28. However, it is foreseen that the terminal API 706, web service API 708, control software application 26 and/or their functions described herein may be distributed for execution across various computing devices of a system, and may be co-located on a single device, without departing from the spirit of the present invention. Moreover, it is foreseen that one or more of the software applications and/or APIs discussed herein may access data of one or more databases with and/or through one or more database management systems, as is commonly known, without departing from the spirit of the present invention.

Exemplary Computer-Implemented Method

Figure 10:
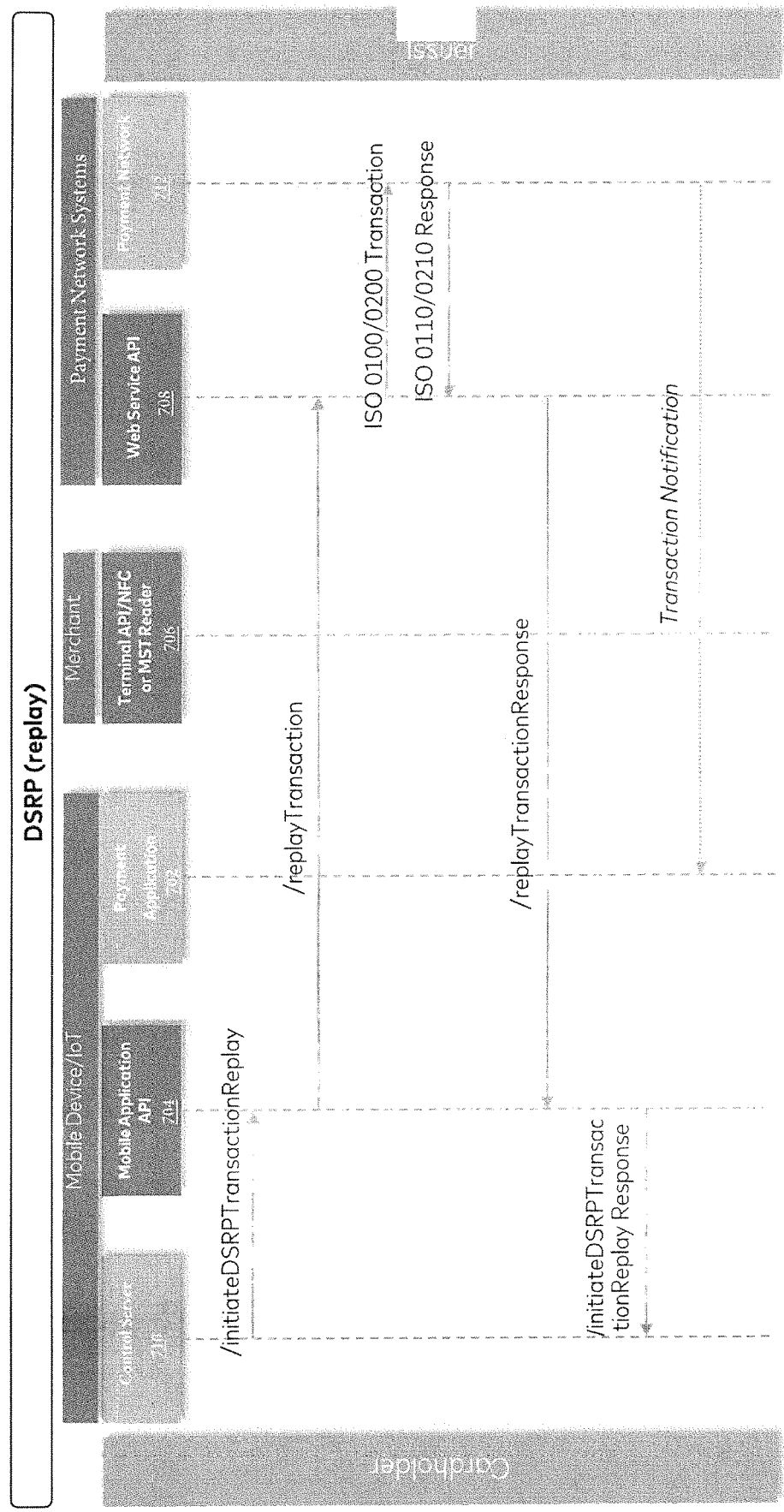
Figure 11:
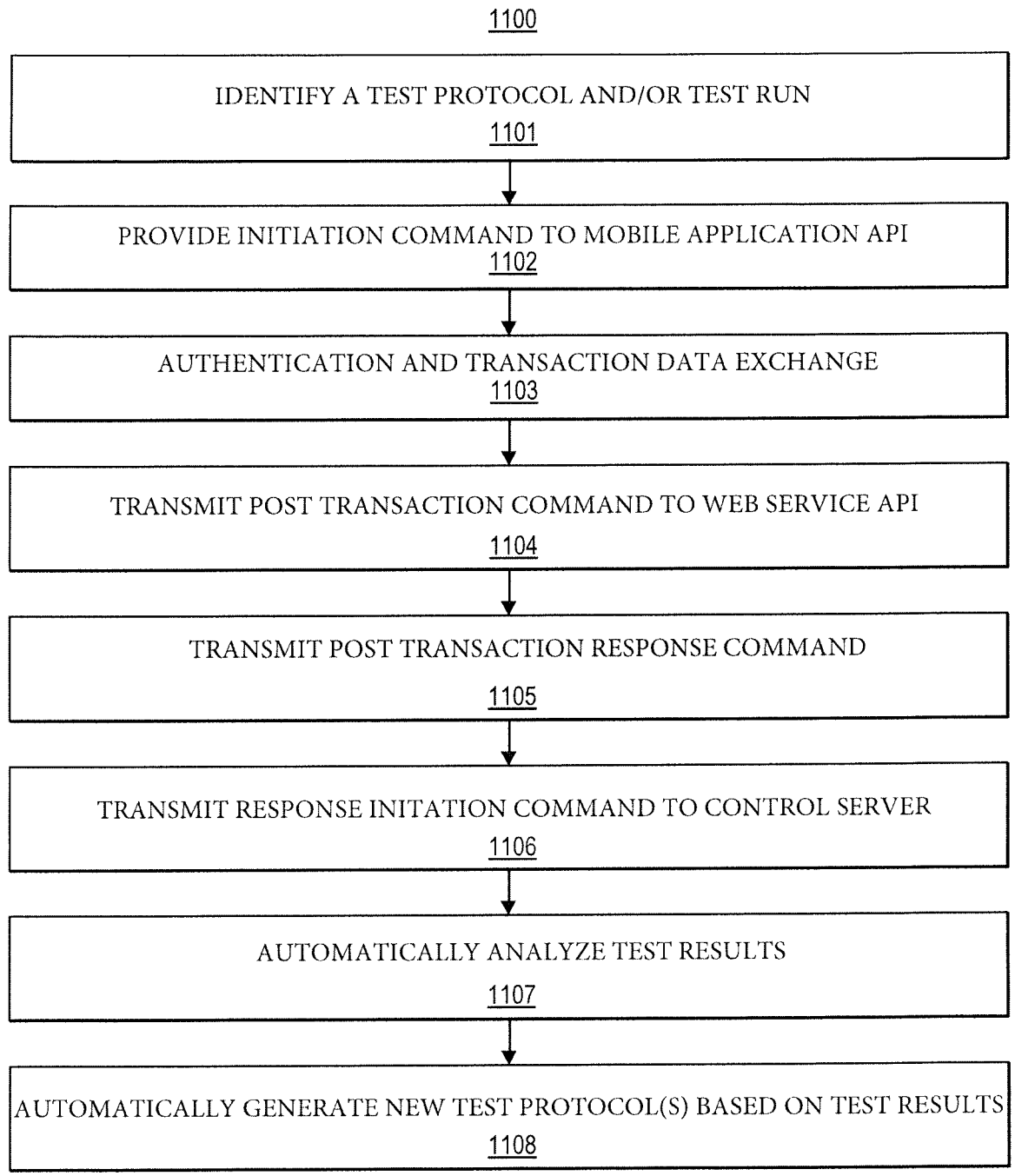
FIG. 11 illustrates at least a portion of the steps of an exemplary computer-implemented method for processing test electronic transactions according to an embodiment of the present invention; and, FIGS. 12A-12E illustrate exemplary data elements and characteristics thereof for use in connection with processing test electronic transactions.

FIG. 11 depicts a listing of steps of an exemplary computer-implemented method 1100 for processing test transactions. Some steps may be performed concurrently as opposed to sequentially, and may in some cases be performed in a different order. In addition, some steps may be optional. The computer-implemented method 1100 is described below, for ease of reference, as being executed by exemplary devices and components introduced with the embodiments illustrated in FIGS. 2-10. For example, the steps of the computer-implemented method 1100 may be performed by a mobile device 20, local computing device 17 (e.g., in coordination with a terminal assembly 18 for an NFC/MST transaction), the servers 14, 16, and the network 21 through the utilization of processors, transceivers, hardware, software (such as the APIs described herein and/or software applications 22, 24, 26, 28 and/or 29), firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs, such as a mobile application and a control software application, stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Test transactions outlined herein may be conducted in part using equipment, software and processes familiar in the industry. Reliance in part on existing technology may enhance the reliability and authenticity of results obtained from such test transactions. For example, the terminal assembly(ies) 18 may essentially comprise known technology for processing NFC and/or MST transaction types (as outlined above), but may be specially configured according to embodiments of the present invention for participating in the test transactions outlined herein. In this regard, the following generally known standards for completing financial transactions are hereby incorporated by reference: ISO 8583 Part 1: Messages, data elements and code values (2003); ISO 8583 Part 2: Application and registration procedures for Institution Identification Codes (IIC) (1998); and ISO 8583 Part 3: Maintenance procedures for messages, data elements and code values (2003)). Also, the payment application 22 and hardware of mobile electronic devices 20 may vary, but may essentially conform to designs and specifications for commercially available mobile devices, and may in an embodiment comprise payment applications and devices originating with and/or installed by original equipment manufacturers such as mobile telephone manufacturers.

To illustrate an exemplary method for conducting a financial transaction that may be used with embodiments of the present invention, in an embodiment a terminal assembly 18 may establish communications with a mobile electronic device 20. The terminal assembly 18 may send a command requesting information on what payment application(s) the mobile electronic device 20 has. The mobile electronic device 20 may pass the requested information back to the terminal assembly 18. The terminal assembly 18 may select the appropriate payment application 22 using an application identifier. File control information, application interchange profile information, and application file locator information may then be exchanged between the terminal assembly 18 and the mobile electronic device 20. The terminal assembly 18 may then read information regarding the transaction from the mobile electronic device 20. The terminal assembly 18 may then send certain identifying information for the putative transaction to the mobile electronic device 20 with a request for cryptogram(s). The mobile electronic device 20 may provide the requested cryptogram(s). The various commands and data involved in such conventional transactions—such as those exemplary steps outlined above—are familiar to the skilled artisan. Moreover, additional or fewer steps may be used in conjunction with certain methods for conducting financial transactions within the scope of the present invention. For instance, additional authentication and error correction steps may be incorporated without departing from the spirit of the present invention.

The web service server 16 may also include known technology for receiving, formatting and/or transmitting transaction data to and from the payment network 21 to enable processing thereby according to known methods (e.g., by emulating processes performed by prior art acquirers). The web service server 16 may comprise conventional components and be configured for performing conventional functions in performing as a secure communications conduit to the payment network 21, although some of the content of those communications may be novel. In other embodiments, the messaging format utilized among the devices of the system 10 may be enhanced to accommodate enhanced communication capabilities, in which cases the web service server 16 may incorporate software programming to support the enhanced messaging format. For example, the web service server 16 may be specially configured to receive and implement instructions from the local control computing devices 17 and/or mobile electronic devices 20 relating to emulation of a delayed or timed out transaction scenario. The web service server 16 may also be configured to record certain data regarding test transactions it processes.

Moreover, certain transaction data exchanged according to embodiments of the present invention is defined by the specifications of ISO. More particularly, ISO 8583 specifies message structure, format and content, data elements and values for data elements comprising a common interface by which financial transaction card-originated messages can be interchanged. While certain transaction data elements may be considered optional and others required under common implementations of ISO 8583, depending on the processing entity(ies) and/or regions in question for example, such variances are well understood by a person of ordinary skill.

For the sake of brevity and clarity, descriptions of well-known electronic transaction technology and data, including that outlined above, will be generally avoided here. As a particular example, the structure, function and/or use of technology and data commonly associated with DSRP, NFC and/or MST transaction types should be understood to apply to the embodiments of the present invention outlined hereinbelow except as otherwise described in or fairly understood from this disclosure. However, certain otherwise generally known technology or data—such as hardware, software or processes—may be described herein, for instance in cases where the structure, function and/or use are considered related to and/or are altered under novel aspects of embodiments of the present invention.

Turning now to FIG. 12, exemplary transaction data elements that may be exchanged between devices and/or software components of embodiments of the present invention are listed as records in a table format along with descriptive information regarding the data elements. The descriptive information includes: "Type," referring to a format of the data elements; "Max Length," referring to a maximum number of digits of the data elements; "Primary," referring to whether the data elements are preferably provided to execute a specific command described below in connection with the exemplary computer-implemented method 1100 (as opposed to being purely discretionary in relation to the command in which it may be included); and "Description," referring to the nature of the data elements. It should be noted that FIG. 12E is organized separately to include metadata regarding mobile electronic devices 20, with the remaining data elements being organized within FIGS. 12A-D.

The data elements exchanged at any particular step of the process may vary according to the requirements and goals of the exchange and commands in question. Moreover, some data elements may be optional. Further, it should be understood that particular data elements may or may not be present in a given embodiment, and may be present or provided for under different and/or multiple commands (described below). Similarly, the item labeled "Primary" in FIG. 12 generally includes indicators as to whether the data field in question should be populated to carry out the command(s) with which it is associated in the exemplary description below. That is, if "Yes" appears in the Primary column, it is presumed that the data field in question should be populated for a test transaction to be completed according to the exemplary embodiment described below. One of ordinary skill will appreciate, however, that various other embodiments within the scope of the invention may specify such data element(s) as merely optional with respect to or altogether absent from any such command(s).

Further, one of ordinary skill would immediately understand that the format of such data elements may vary, and that the parameters and metadata presented below are merely exemplary. For example, exemplary data elements of embodiments of the present invention may be included in one or more existing fields provided for under the ISO 8583 standard, and/or may be given meaning according to one or more message type indicators and/or bitmaps in a manner analogous to common practice under the ISO 8583 standard. However, exemplary data elements of embodiments of the present invention may be otherwise exchanged, for example under different mapping and message header protocols, without departing from the spirit of the present invention.

Returning now to FIG. 11, and referring to step 1101, the control server 710 may identify a test protocol and/or run to be performed via one or more mobile application APIs 704. The control server 710 may store and/or access a plurality of databases. The databases may store test protocols (e.g., collections of test runs or standards/rules for generating test runs) for execution via mobile application APIs 704. The control server 710 may participate in generating the test protocols from data stored in and/or for storage within the databases. For example, the control server 710 may automatically and/or with user assistance define one or more data element(s). The control server 710 may be configured to define and/or to receive user input defining other data elements as either static or variable. The control server 710 may otherwise define a test protocol and generate a plurality of test runs, wherein the aforementioned defined data element is constant or varies according to the defined relationship, static data elements are held constant, and the variable data elements are varied freely or according to a rule or rules to create a significant variety of permutations to provide a meaningful array of test results.

For example, the control server 710 and/or a user may wish to test how an MST transaction might be affected if torn with a tearMSTTiming of eight hundred (800) milliseconds (see FIG. 12 for data element descriptions). Having defined the tearMSTTiming data element, the control server 710 and/or user may choose certain data elements that should remain static in a corresponding test protocol, such as data elements that are known to have little effect on the success rate of torn MST transactions. Likewise, variable data elements may be chosen based, for example, on their perceived likelihood of contributing to the success rate of torn MST transactions. The control server 710 and/or user may also choose certain rules or relationships between data elements to govern how variable data elements should change between test runs according to the protocol to obtain the most meaningful results. In this manner, the test protocol may be defined, at least in part. The control server 710 may then generate a plurality of test runs from the test protocol, representing the full spectrum of data element permutations defined by the test protocol. For instance, one subset of test runs within the 800 ms tearMST test protocol may vary only by mobile electronic device OEM, and another subset of test runs may vary only by geographic region (which may relate to the physical location of the mobile electronic device(s) executing the test runs and/or to the terminalRegion data element), respectively because OEM and geographic region may have been considered variables that can influence the outcome of torn MST transaction tests. It is foreseen that a wide variety of test protocols and/or test runs may be generated and/or tested without departing from the spirit of the present invention.

The control server 710 may also store, maintain and/or access a directory or listing of mobile electronic devices 20, mobile application APIs 704, local control computing devices 17, and/or terminal APIs 706. The directory may include device identification and/or physical address information necessary to transmit and/or receive transaction data and/or test run instructions. In an embodiment, the directory may be consulted prior to generating a test protocol and/or the resultant plurality of test runs, and generation of the test protocol and/or runs may be influenced by such consultation, for example based on the nature of devices/applications listed in the directory and/or their availability, load balancing, and/or other factors. In another embodiment, the directory is consulted after generation of the protocol and/or plurality of test runs to match the test runs to appropriate devices and APIs for execution.

In an embodiment, geographically-centered clusters of mobile electronic devices 20 are maintained respectively by local control computing devices 17. (See FIG. 2) For instance, a cluster may be maintained in each state within the United States, and at least one cluster within each other country around the world. The control server 710 may receive updates periodically or continuously from the local control computing devices 17 detailing the mobile electronic devices 20 available for use in testing at the respective cluster locations, as well as providing details about the devices 20 such as whether they are physically proximate an NFC and/or MST reader (thus enabling testing for those transaction types), which OEM originated each device 20, what operating system version each device 20 is running, and other pertinent information. As described above, such information may inform generation of test protocols and/or pluralities of test runs, as well as enable the control server 710 to appropriately target or address test run instructions to cluster(s).

It is also foreseen that the control server 710 may not maintain a database or directory listing of mobile electronic devices 20, mobile application APIs 704, local control computing devices 17, and/or terminal APIs 706. In an embodiment, the control server 710 may maintain or transmit untargeted test instructions to an accessible repository—e.g., a cloud storage service—and local control computing device(s) 17 may access and match such test run(s) against devices 20 they maintain. The local control computing device(s) 17 having matching devices 20 may automatically perform the test run and/or may transmit an acceptance notification indicating an intent to perform the test run to the control server 710. The control server 710 may or may not confirm award of the test run to an accepting local control computing device 17 prior to performance of the test run.

One of ordinary skill will appreciate that a variety of methods for generating and maintaining test protocols and/or test runs, for tasking test runs to test devices, and/or for maintaining such devices, are within the ambit of the present invention.

Referring to step 1102, the control server 710 may transmit or otherwise provide an /initiateContactlessTransaction or /initiateDSRPTransaction command to a mobile application API 704, directly and/or via a local control computing device 17. (See also FIGS. 7-8) It is foreseen that the transmission may be automated or triggered manually without departing from the spirit of the present invention. A "command" may be a grouping of data elements—which may be accompanied by data headers, bitmaps, or other metadata indicating the nature of the command or request and/or indexing/mapping the command contents for consumption by the receiving device—for performing one or more step(s) or sub-step(s) in the exemplary computer-implemented method 1100 for performing test transactions. Portions of commands—such as data element groupings or arrays—may be delimited using curly brackets and/or periods, data elements may be delimited from each other using commas, and portions of commands may be otherwise punctuated to conform with syntax and standards employed by the devices of various embodiments of the present invention. In accordance with FIG. 12, exemplary data elements included in the aforementioned transaction initiation commands may include:

| /initiateDSRPTransaction | /initiateContactlessTransaction |
| --- | --- |
| "conversationId":"1122334455", "testCaseId":"testcase12345", "transactionCurrencyCode":"840", "transactionAmount":"3.22", "transactionType":"UCAF", "merchantName": "IN-APP Merchant ABC", "partialPayment" : false, "transactionInjectDataElement":"DE55", "transactionInjectValue":"ABCDEFG12345", "returnDeviceMetadata" : true. | "conversationId":"1122334455", "testCaseId":"testcase12345", "terminalType":"CHIP", "terminalRegion":"840", "tearNFC":true, "tearNFCTiming":"800", "transactionCurrencyCode":"840", "transactionAmount":"3.22", "merchantName":"NFC Merchant ABC", "transactionInjectDataElement":"DE55", "transactionInjectValue":"ABCDEFG12345", "returnDeviceMetadata":true. |

In an embodiment, the /initiateContactlessTransaction command may also or alternatively include the following data elements: terminalVersion, terminalTrack, tearMagstripe, tearMagstripeTiming, and/or terminalPIN.

The mobile application API 704 may be configured to receive one of the transaction initiation commands and to initiate a test transaction based thereon. In an embodiment, the data elements of the transaction initiation command may only comprise a portion of the data elements needed to perform a test transaction, and the mobile application API 704 may be configured to retrieve the remaining data elements and settings needed to perform the transaction. In an embodiment, the mobile application API 704 in receipt of the exemplary command may be configured to recognize one or more data elements, the value(s) thereof, one or more associated data accompanying the command, and/or the command itself. The mobile application API 704 may also be configured to retrieve and/or generate associated data elements and settings needed to perform the test run.

For example, the mobile application API 704 may be configured to recognize a transaction type from the aforementioned commands and retrieve and/or generate additional data elements, in accordance with ISO 8583, for performing the test run. The additional data elements may be retrieved or generated in accordance with known processing techniques for the transaction type in question. For example, the conversationId and testCaseId data elements may be used alternatively or in addition to fields eleven (11) and thirty-seven (37) defined under ISO 8583 for standard transactions. Where fields eleven (11) and thirty-seven (37) are also to be included, the mobile application API 704 and/or terminal API 706 may populate one or both fields in conjunction with performing the test run according to conventional methods. It is foreseen that the mobile application API 704 and/or terminal API 706 may be configured to retrieve and/or generate standardized data elements, and/or perform other known functions in conjunction with carrying out a test transaction, without departing from the spirit of the present invention.

It should also be noted that the mobile application API 704, web service API 708 and/or terminal API 706 are preferably configured to substitute test values into data fields normally populated during a transaction by traditional automated functions of transaction processing devices. This may enable a greater spectrum of testable transaction parameter permutations. In an embodiment, the merchantName, terminalType, terminalVersion, terminalTrack, terminalRegion, and/or transactionCurrencyCode data fields may be populated according to instructions issued by the control server 710, thus enabling a fuller spectrum of testable variables with reduced manpower demands.

The mobile application API 704 may—for example based on the terminalType data element or otherwise on a portion of an /initiateContactlessTransaction command—transmit a /startNFCTransaction or /startMSTTransaction command (see FIG. 7) to the terminal API 706. In accordance with FIG. 12, exemplary data elements included in the aforementioned start transaction commands may include:

| /startNFCTransaction | /startMSTTransaction |
| --- | --- |
| "conversationId":"1122334455" "testCaseId":"testcase12345" "terminalType": "CONTACTLESS_MAGSTRIPE", "terminalVersion":3, "terminalTrack":1, "terminalRegion":"840", "transactionCurrencyCode":"840", "transactionAmount":"3.22", "merchantName":"NFC Merchant ABC", "terminalOverride": { "terminalOverrideParameter" :"MS_CVM_CAPABILITY_NO_CVM_REQD", "terminalOverrideValue" : "01" }, "osType" : "Android", "osVersion" : "7.0" | "conversationId":"1122334455", "testCaseId":"testcase12345", "transactionCurrencyCode":"840", "transactionAmount":"3.22", "merchantName":"MST Merchant ABC", "osType": "Android", "osVersion" : "7.0" |

In an embodiment, the /startNFCTransaction command may also or alternatively include the following data elements: tearNFC, tearNFCTiming, terminalPIN, transactionInjectDataElement, and/or transactionInjectValue. Likewise, a /startMSTTransaction command may also or alternatively include the following data elements: tearMST, tearMSTTiming, terminalPIN, transactionInjectDataElement, transactionInjectValue, terminalOverride, terminalOverrideobject, terminalOverrideParameter, and/or terminalOverrideValue. In an embodiment, the "terminalOverride" commands may provide valuable insight into how transactions may be processed differently under various terminal assembly conditions and parameters—including various hardware and/or software configurations—without the need for actually locating a physical acquirer terminal satisfying each of those conditions and parameters. Instead, a terminal API 706 may be automatically reconfigured to emulate all or some of the specified configuration(s) with corresponding reader(s), providing a significantly more efficient means for performing test transactions. Such on-the-fly terminal configuration variability may support testing of edge scenarios and regional variations.

It should also be noted that the commands set forth herein in connection with various steps are merely exemplary, and do not necessarily represent a related series of commands and data elements from a single test run. For instance, the illustrative/initiateContactlessTransaction command set forth above includes a tearNFC data field and element, whereas the exemplary /startNFCTransaction command does not specify the tearNFC data field or element, and such commands therefore may not form a part of the same test run. Put another way, the present disclosure is intended to touch on a variety of data element permutations that may comprise test runs, and the commands disclosed throughout discussion of the method 1100 may or may not be used together in test run sequences.

Figure 7:
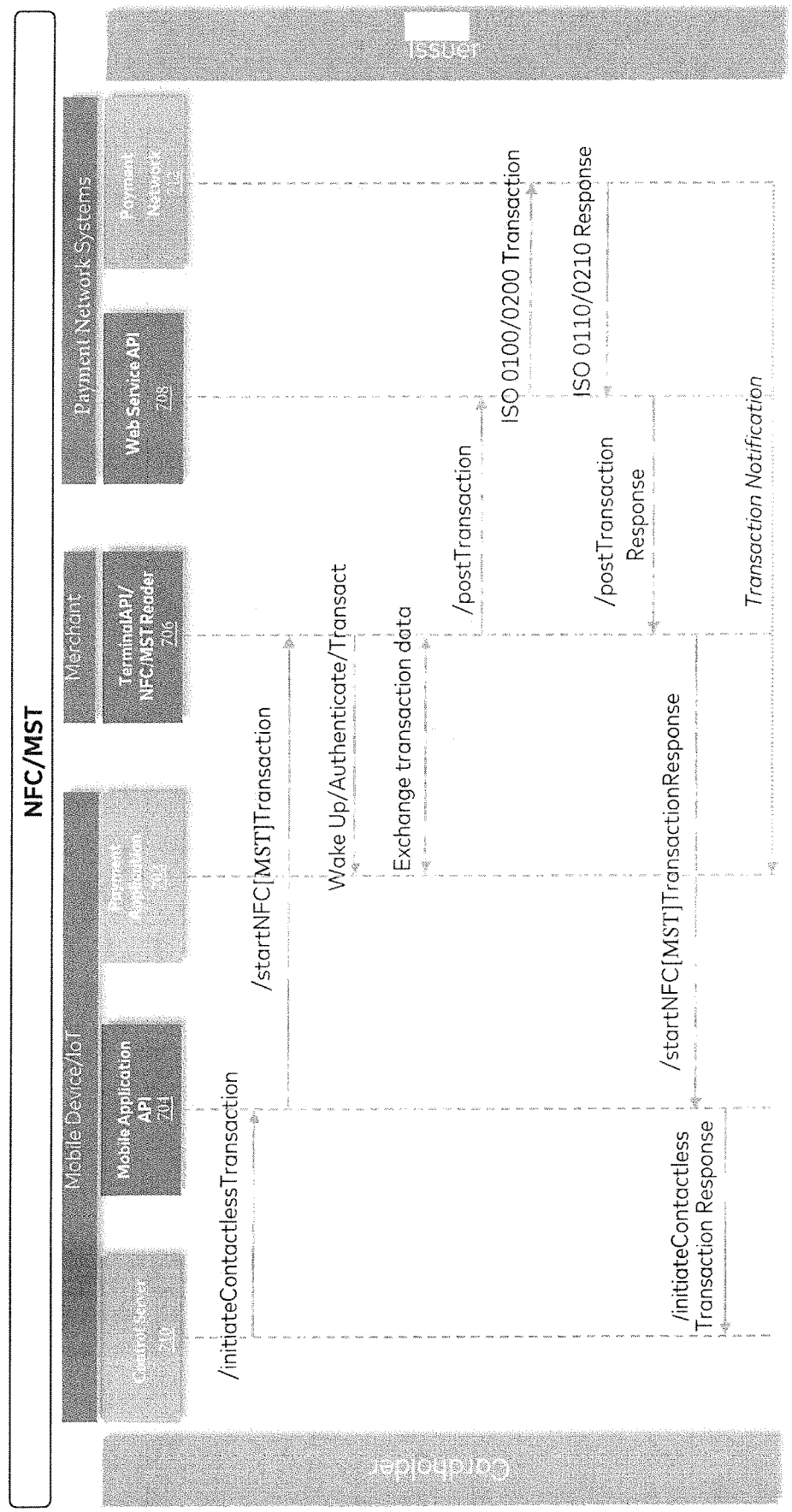
FIGS. 7-10 are flowcharts of various components of, and steps or actions performed via, exemplary systems for processing test electronic transactions according to embodiments of the present invention.
Figure 8:
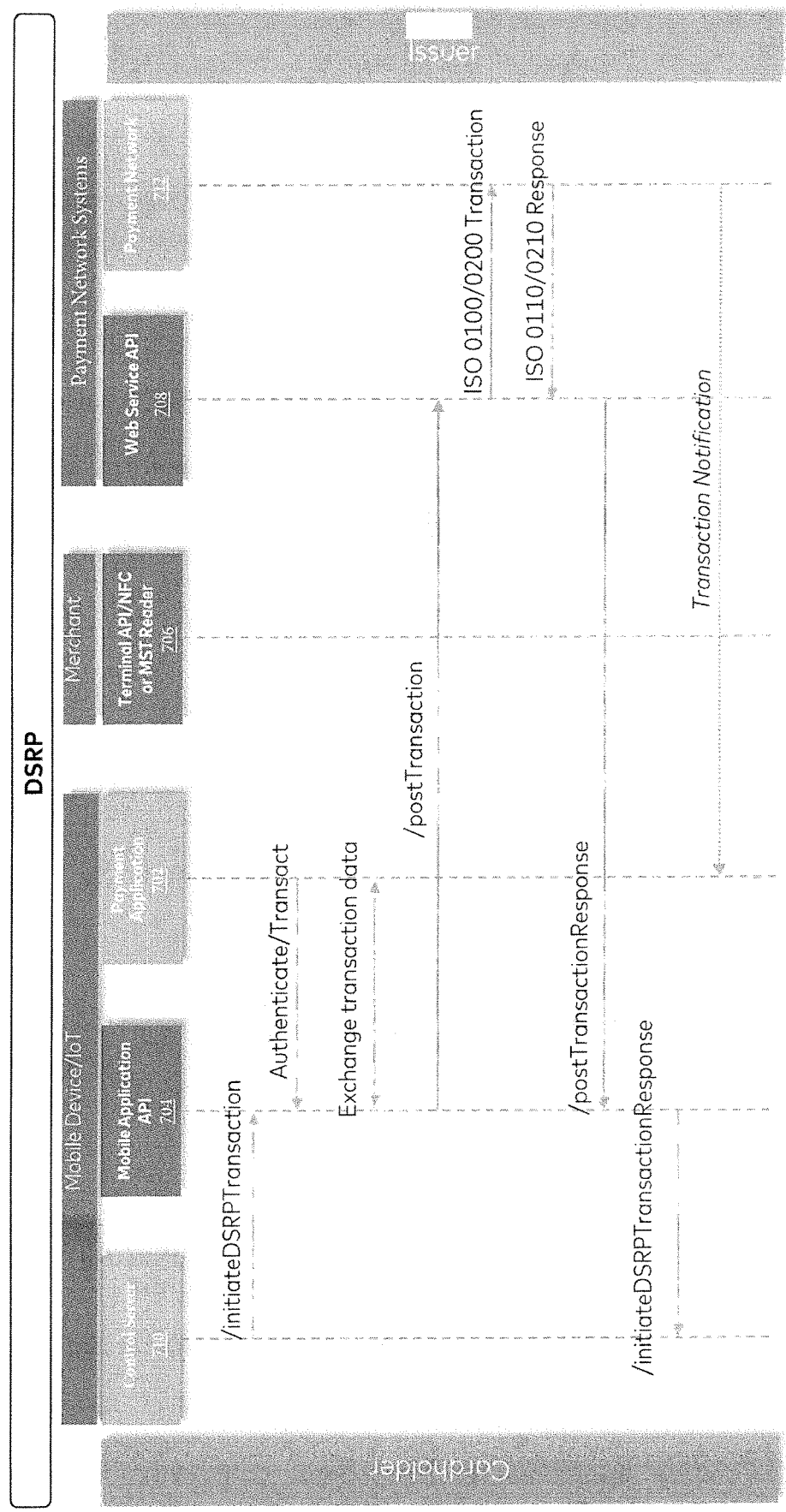

Referring to step 1103, authentication and transaction data exchange may be performed, at least in part, according to generally known NFC, MST and/or DSRP methods, with the goal of providing the terminal API 706 (for NFC/MST) or the mobile application API 704 (for DSRP) with sufficient transaction data to enable generation of a cryptogram and /postTransaction command for transmission to the web service API 708, as described in more detail below. As illustrated in FIG. 7, authentication and transaction data exchange may be performed between the terminal API 706 and the payment application 702 for NFC and MST test runs. As illustrated in FIG. 8, authentication and transaction data exchange may be performed between the mobile application API 704 and the payment application 702 for DSRP test runs. The transaction data obtained by the terminal API 706 or mobile application API 704 through performance of step 1103 includes the one or more cryptogram(s) encoding certain transaction data, though it is foreseen that other transaction data may be obtained for inclusion in the /postTransaction command (see discussion below) without departing from the spirit of the present invention.

The terminal API 706 may also depart from conventional practice(s), for example where a /startNFCTransaction command includes tearNFC and tearNFCTiming data fields. The terminal API 706 may be configured, according to embodiments of the present invention, to turn the NFC reader (e.g., of a terminal assembly 18) off according to the timing specified in the tearNFCTiming data field during the authentication and transaction data exchange. Test runs conducted with such departures from conventional practice may provide valuable information regarding the impact of such timing on transactions conducted via, for example, different hardware or software operating systems. For another example, the "transactionInject . . ." data fields may be used to inject specified data elements in specified fields to override what is generated in the cryptogram according to conventional operation. Test runs conducted with such departures from conventional practice may be used for invalid test scenarios.

Referring to step 1104, a /postTransaction command may be transmitted to the web service API 708. For example, in an NFC or MST test run, the terminal API 706 may transmit the /postTransaction command after gathering the requisite transaction data from the mobile application API 704 and payment application 702 according to steps outlined above. In a DSRP test run, on the other hand, the mobile application API 704 may transmit the /postTransaction command after gathering certain requisite transaction data (e.g., a cryptogram) from the payment application 702. In accordance with FIG. 12, exemplary data elements included in the aforementioned post transaction command may include:

---

/postTransaction

"conversationId" : "1122334455",
"pointOfSaleEntryMode" : "07",
"requestorVersion" : "1.0.40",
"transactiondata" : {
"encryptedTransactionData" : "aabbccddeeff",
"encryptionKey" : "1122334455",
"initializationVector" : "ffeeddccbbaa",
"hashingAlgorithm" : "SHA512",
"keyFingerprint" : "11aa22bb33"
},
"overrideAcquirerInstitutionId" : "123456",
"overrideForwardingInstitutionId" : "987654",
"addSendSeconds" : "10",
"addResponseSeconds" : "2",
"overrideDecisionResponse" : "00"

---

In addition to conventional data fields, a /postTransaction command according to embodiments of the present invention may specify data fields such as the above-listed "override . . . ," "addSendSeconds" and/or "addResponseSeconds" fields. The web service API 708 may be configured to utilize such fields to enable processing of a /postTransaction command for a test run within existing payment network 712, and may otherwise provide for more robust testing within the test system. For example, the "overrideAcquirerInstitutionId" and "overrideForwardingInstitutionId" fields may be used respectively to populate missing Acquirer Institution ID and Forwarding Institution ID fields, thereby enabling the test transaction to proceed within the payment network 712. The "overrideDecisionResponse" field may be used to override the transactionResponse (see below) received from the payment network 712 to force the exact desired result for a particular test run. For another example, the "add . . . Seconds" fields may be used to provide for more robust testing that includes delays in data exchanges with the payment and/or issuer network(s), which may yield valuable insight for potential sources of error within the system. It should also be noted that one or more conventional data fields (not shown)—such as a bank identification number (BIN) data field—may be populated with data elements indicating that the transaction data being transmitted is associated with a test run. In an embodiment, such data field(s) may earmark the transaction data for processing via a test environment of the payment network 712 and/or an issuer network.

The web service API 708, in receipt of the /postTransaction command, may have the necessary information for generating and transmitting a conventional payment card system transaction authorization request. Referring to step 1105, the web service API 708 may transmit such a transaction request to the payment network 712. The web service API 708 may format the request—for example using ISO interchange standards—and undergo message and sender/recipient authentication processes prior to or otherwise in conjunction with the transmission. The web service API 708 may also record and store a transactionCount associated with a particular user or account, for instance to facilitate tracking the number of test runs conducted by the user/account over a given time period.

The payment network 712 may route the transaction request in a conventional manner to the issuer of the user's account, for example in reliance on a BIN data field. As outlined briefly above, this may be done within production and/or test environments according to conventional practice(s). The issuer may generate an authorization response in a conventional manner to indicate whether the transaction is authorized. For example, the issuer may determine whether a test payment card account indicated by a payment card account number included in the authorization request is in good standing and has sufficient funds or available credit to cover the requested transaction. If so, the authorization response indicates that the transaction is authorized. In accordance with conventional practices, the issuer may transmit the authorization response to the payment network 712. The payment network 712 may route the authorization response to the web service API 708 in a conventional manner.

Referring to step 1105, the web service API 708 may transmit a /postTransaction Response command to the terminal API 706 (in the case of NFC/MST transactions) or the mobile application API 704 (in the case of a DSRP transaction). In accordance with FIG. 12, exemplary data elements included in the aforementioned post transaction response command may include:

| /postTransaction Response |
|---|
| "webServiceRequestId":"555511112222", |
| "transactionCount":"56", |
| "responseFromNetwork":"00", |
| "transactionResponse": { |
| "encryptedTransactionResponse":"aabbccddeeff", |
| "encryptionKey":"1122334455", |
| "initializationVector":"ffeeddccbbaa", |
| "hashingAlgorithm":"SHA512", |
| "keyFingerprint":"11aa22bb33" |

In addition to conventional data fields, a /postTransaction Response command according to embodiments of the present invention may specify data fields such as the above-listed "transactionResponse" field—together with the five subsequent data fields—which provide an encrypted data block containing the actual raw response from the payment network 712. Returning this data according to embodiments of the transaction request response framework outlined herein may provide important contextual data surrounding a test run that may be utilized in debugging or otherwise identifying actual or potential system errors.

The terminal API 706 may then transmit a /startNFCTransactionResponse or /startMSTTransactionResponse command (see FIG. 7) to the mobile application API 704, where applicable. In accordance with FIG. 12, exemplary data elements included in the aforementioned start transaction response commands may include:

| /startNFCTransactionResponse | /startMSTTransactionResponse |
|---|---|
| "responseFromNetwork":"00", | "responseFromNetwork":"00", |
| "terminalVersion":"4.0.23", | "terminalVersion":"4.0.23", |
| "NFCReader" : "BROADCOM NFC Smartcard Reader 1", | "webServiceRequestId":"555511112222" |
| "webServiceRequestId":"555511112222" | |

In an embodiment, the /startNFCTransaction Response or /startMSTTransaction Response command may also or alternatively include the responseFromTerminal data element.

Referring to step 1106, the mobile application API 704 may gather device metadata and transmit an /initiateDSRPTransactionResponse or an /initiateContactlessTransactionResponse command to the control server 710. The mobile application API 704 may also or alternatively store the transaction data locally in a memory element. In accordance with FIG. 12, exemplary data elements included in the aforementioned response initiation commands may include:

| /initiateDSRPTransactionResponse | /initiateContactlessTransactionResponse |
|---|---|
| "responseFromNetwork" : "00", | "responseFromTerminal" : "Error or no response received from GENERATE AC", |
| "deviceMetadata" : { | "deviceMetadata" : { |
| "batteryLevel" : "94", | "batteryLevel" : "94", |
| "ipV4Address" : "192.168.255.255", | "ipV4Address" : "192.168.255.255", |
| "bluetoothStatus" : "Enabled", | "bluetoothStatus" : "Enabled", |
| "wifiStatus" : "Connected", | "wifiStatus" : "Connected", |
| "mobileNetworkType" : "LTE", | "mobileNetworkType" : "LTE", |
| "uptime" : "5:46:06", | "uptime" : "5:46:06", |
| "osType" : "Android", | "osType" : "Android", |
| "osVersion" : "7.0", | "osVersion" : "7.0", |
| "modelNumber" : "SM-G935YY", | "modelNumber" : "SM-G935YY", |
| "deviceName" : "My Phone", | "deviceName" : "My Phone", |
| "usedMem" : "3000", | "usedMem" : "3000", |
| "totalMem" : "4096", | |

-continued

| /initiateDSRPTransactionResponse | /initiateContactlessTransactionResponse |
|---|---|
| "usedStorage" : "20000", "totalStorage" : "32768" | "totalMem" : "4096", "usedStorage" : "20000", "totalStorage" : "32768" |

The aforementioned response initiation commands may additionally include one or more unique data elements associated with the transaction or test run as a means for associating the respective initiate[DSRP/Contactless]TransactionResponses with the corresponding requests. The payment network 712 and/or issuer may also directly transmit a transaction notification regarding the test run to the corresponding mobile electronic device directly, which may provide redundant and/or additional results data.

Referring to step 1107, the control server 710 may automatically analyze the test results. In a simple embodiment, groups of test runs are preferably considered together to determine the affect(s) of varying a single (independent) variable on a single (dependent) variable. In another embodiment, data regression, sequence labeling, computer learning, and/or other known methods may be used to identify patterns between variables of the data elements.

For instance, it is foreseen that the aforementioned types of data elements as well as the relationships between them may be observed, and data elements may be automatically adjusted for future test runs by employing machine learning techniques. A machine learning program may include curve fitting, regression model builders, convolutional or deep learning neural networks, Bayesian machine learning techniques, or the like. The machine learning program may be fed test transaction results data and underlying transaction data to determine patterns of sub-optimal performance of the system devices and/or payment network 712. As an example, the control server 710 may receive a copy of a third party's newly-developed mobile application configured to initiate DSRP transactions. The control server 710 may instruct one or more local control computing device(s) and/or mobile electronic devices to install the new mobile application for testing on one or more mobile electronic devices for testing. In this scenario, the new mobile application may comprise the mobile application API 704 (see FIGS. 7-10), and the mobile application 24 may generally be configured to interface with and feed transaction data for test transactions to the mobile application API 704 for execution.

The control server 710 may initially generate test runs from a broad sweeping test protocol in an attempt to identify potential problem areas in the new mobile application API 704. The test runs may be automatically executed after being tasked via the control server 710 to electronic devices, and results may be received in accordance with the processes outlined and/or referenced above. The results may be automatically analyzed, and patterns between the results and certain of the transaction data may be identified using one or more machine learning techniques. For instance, the results may indicate that Android mobile electronic devices generally experience more lag than normal through use of the mobile new mobile application API 704. The results may indicate that an authorization request repeat command was received for a transaction run specifying only a modest addRespondSeconds and/or addSendSeconds data element.

Referring to step 1108, the control server 710 may automatically generate new test protocol(s). In the example given immediately above, the control server 710 may shape one or more new test protocols based on the first round of test results, for example by revising the initial test protocol in view of the potential factors contributing to sub-optimal performance identified in step 1107. In the example given above, where the results indicate a delay in processing transactions via Android device(s), a test protocol may be generated focusing on testing the new mobile application API 704 across various types of Android device(s) implemented in a variety of terminal and transaction type configurations, in an attempt to hone in on the source(s) of potential error. In this manner, a fully automated, iterative, and cost-effective means for testing payment networks for potential bugs and weaknesses may be implemented.

Additional Exemplary Computer-Implemented Methods

Embodiments of the present invention may provide additional tools for robust processing of test transactions. Some steps of the below-referenced methods may be performed concurrently as opposed to sequentially, and may in some cases be performed in a different order. In addition, some steps may be optional. The computer-implemented methods are described below, for ease of reference, as being executed by exemplary devices and components introduced with the embodiments illustrated in FIGS. 2-10. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs, such as a mobile application and a control software application, stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Figure 9:
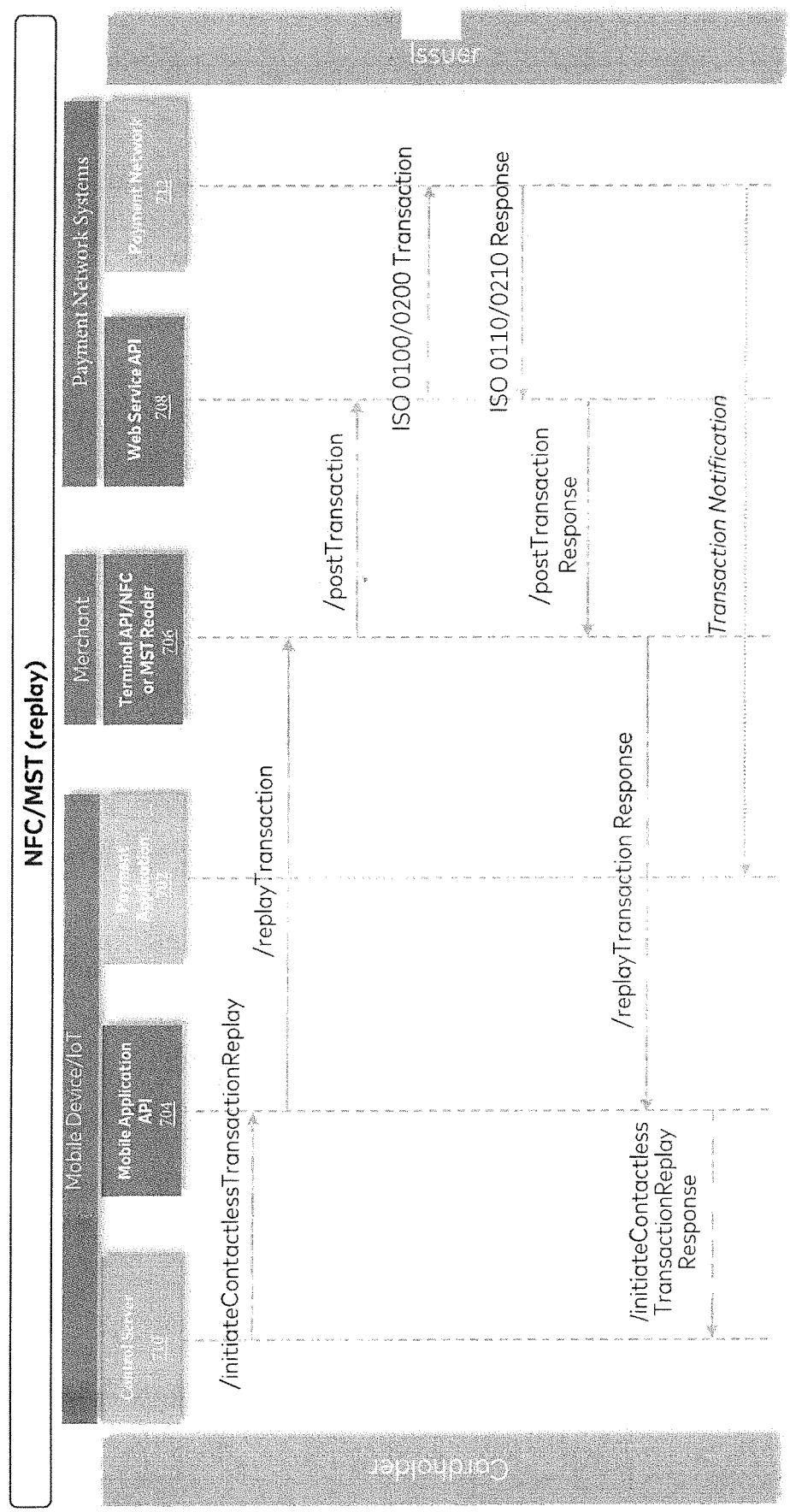

Turning to FIGS. 9-10, embodiments of the present invention may include methods for exact "replay" of previously executed test transactions. Replay of a prior transaction may provide additional information regarding the potential sources of error contributing to sub-optimal performance of a system for processing test transactions. For example, if the transaction data obtained for transmission at the /postTransaction step 1104 of the method 1100 can be accessed and reused in a replay transaction within the system at a second time, the variation(s) in the system that might have contributed to any sub-optimal performance during the first test may be further isolated for identification.

In accordance with FIG. 12, exemplary data elements included in a replay initiation command may include:

| /initiateDSRPTransactionReplay | /initiateContactlessTransactionReplay |
|---|---|
| "conversationId" : "1122334455",<br>"previousTestCaseId" : "testcase12345",<br>"transactionReplayTestCaseId" :<br>"testcase54321",<br>"returnDeviceMetadata" : true | "conversationId" : "1122334455",<br>"previousTestCaseId" : "testcase12345",<br>"transactionReplayTestCaseId" :<br>"testcase54321",<br>"returnDeviceMetadate" : true |

A /replayTransaction command may then be transmitted to the web service API 708. For example, in an NFC or MST test run, the mobile application API 704 may transmit the /replayTransaction command to the terminal API 706, which may then transmit a corresponding /postTransaction command to the web service API 708. In a DSRP test run, on the other hand, the mobile application API 704 may transmit the /replayTransaction command directly to the web service API 708. Prior to or in conjunction with transmitting a /replayTransaction command, the terminal API 706 or mobile application API 704 may retrieve the transaction data corresponding to one or more of the unique identifier(s) provided in the replay initiation command (for example, where the terminal API 706 or mobile application API 704 accesses a database including records associated with a previously executed test run and keyed to the unique identifier(s)). In accordance with FIG. 12, exemplary data elements included in the aforementioned replay transaction command may include:

| /replayTransaction |
|---|
| "conversationId" : "1122334455",<br>"previousTestCaseId" : "testcase12345",<br>"transactionReplayTestCaseId" : "testcase54321" |

The web service API 708 may forward the transaction data for processing by the payment network 712 and/or issuer according to the steps outlined above, and the payment network 712 may provide a response to the web service API 708. The web service API 708 may then transmit a /postTransactionResponse command to the terminal API 706 (in the case of NFC/MST transactions), substantially in accordance with the steps outlined in connection with the test run methods of previously described embodiments. The terminal API 706 (in the case of NFC/MST transactions) or the web service API 708 (in the case of DSRP transactions) may then transmit a /replayTransactionResponse command to the mobile application API 704. In accordance with FIG. 12, exemplary data elements included in the aforementioned replay transaction response command may include:

| /replayTransactionResponse |
|---|
| "responseFromNetwork" : "00",<br>"webServiceRequestId" : "555511112222" |

The mobile application API 704 may gather device metadata and transmit an /initiateDSRPTransactionReplayResponse or an /initiateContactlessTransactionReplayResponse command to the control server 710. The mobile application API 704 may also or alternatively store the transaction data locally in a memory element. In accordance with FIG. 12, exemplary data elements included in the aforementioned transaction replay response initiation commands may include:

| /initiateDSRPTransactionReplayResponse | /initiateContactlessTransactionReplayResponse |
|---|---|
| "responseFromNetwork" : "05",<br>"deviceMetadata" : {<br>"batteryLevel" : "94",<br>"ipV4Address" : "192.168.255.255",<br>"bluetoothStatus" : "Enabled",<br>"wifiStatus" : "Connected",<br>"mobileNetworkType" : "LTE",<br>"uptime" : "5:46:06",<br>"osType" : "Android",<br>"osVersion" : "7.0",<br>"modelNumber" : "SM-G935YY",<br>"deviceName" : "My Phone",<br>"usedMem" : "3000",<br>"totalMem" : "4096",<br>"usedStorage" : "20000",<br>"totalStorage" : "32768" | "responseFromNetwork" : "00",<br>"deviceMetadata" : {<br>"batteryLevel" : "94",<br>"ipV4Address" : "192.168.255.255",<br>"bluetoothStatus" : "Enabled",<br>"wifiStatus" : "Connected",<br>"mobileNetworkType" : "LTE",<br>"uptime" : "5:46:06",<br>"osType" : "Android",<br>"osVersion" : "7.0",<br>"modelNumber" : "SM-G935YY",<br>"deviceName" : "My Phone",<br>"usedMem" : "3000",<br>"totalMem" : "4096",<br>"usedStorage" : "20000",<br>"totalStorage" : "32768" |

The aforementioned transaction replay response initiation commands may additionally include one or more unique data elements associated with the transaction or test run and/or the replay transaction as a means for associating the respective initiate[DSRP/Contactless]TransactionReplayResponses with the corresponding replay requests. The payment network 712 and/or issuer may also directly transmit a transaction notification regarding the replay test run to the corresponding mobile electronic device, which may provide redundant and/or additional results data.

Embodiments of the present invention may include additional investigative tools for retrieving and/or accessing test transaction data, including device data captured at a previous or current time. The commands may include a getDeviceMetadata command, a retrieveCryptoData command, and a retrieveTerminalSettings command. The getDeviceMetadata command may retrieve information regarding a mobile electronic device analogous to that retrieved using the returnDeviceMetadta data field outlined above, and may include the conversationId data field. The retrieveCryptoData command may return debug level cryptogram information (i.e., transactiondetail) for DSRP or NFC transactions respectively from the mobile application API 704 or the terminal API 706, and may include the following data fields: conversationId, testCaseId, and debugLevel. The retrieveTerminalSettings command may return names and values (i.e., parameterNames and parameterValues) associated with a conversationId to identify which terminalOverride values may or should be changed.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A computer-implemented method for processing test financial transactions, comprising:
   accessing, via a remote-control server, transaction data corresponding to a test run;
   transmitting, via the remote-control server, the transaction data;
   receiving the transaction data at a mobile application API of an electronic device;
   passing the transaction data, including a substitute test value, to a payment application of the electronic device, the substitute test value being selected from the group consisting of: a merchant name, a terminal type, a terminal version, a terminal track, a terminal region, a currency code, an acquirer institution identification, a forwarding institution identification, and an override decision response;
   replacing an automatically-generated value with the substitute test value;
   generating, via the payment application, a cryptogram corresponding to the transaction data and the substitute test value;
   transmitting the cryptogram for submission to a payment network; and
   receiving, at the remote-control server, a transaction response corresponding to the test run.

2. The computer-implemented method of claim 1, further comprising accessing, via the remote-control server, physical address information for a local control computing device, wherein transmitting the transaction data to the mobile application API includes transmitting the transaction data to the local control computing device using the physical address information.

3. The computer-implemented method of claim 2, wherein the local control computing device manages a cluster comprising a plurality of electronic devices including the electronic device.

4. The computer-implemented method of claim 3, further comprising—
   maintaining, via the remote-control server, a database including information regarding the plurality of electronic devices,
   matching the transaction data to the electronic device through reference to the database including information regarding the plurality of electronic devices.

5. The computer-implemented method of claim 4, wherein the information regarding the plurality of electronic devices specifies at least one of: (A) physical proximity to a terminal assembly; (B) original equipment manufacturer; and (C) operating system.

6. The computer-implemented method of claim 1, wherein—
   the transaction data is transmitted via the remote-control server to a cloud storage service,
   the cloud storage service provides the transaction data for transmission to the mobile application API.

7. The computer-implemented method of claim 6, further comprising—
   accessing, via a local control computing device, the cloud storage service,
   downloading, via the local control computing device, the transaction data,
   transmitting the transaction data to the mobile application API.

8. The computer-implemented method of claim 7, wherein the local control computing device manages a cluster comprising a plurality of electronic devices including the electronic device.

9. The computer-implemented method of claim 8, wherein the plurality of electronic devices, including the electronic device, are smartphones.

10. The computer-implemented method of claim 9, further comprising—
    maintaining, via the local control computing device, a database including information regarding the smartphones,
    matching the transaction data to the electronic device through reference to the database including information regarding the smartphones.

11. The computer-implemented method of claim 10, wherein the information regarding the plurality of smartphones specifies at least one of: (A) physical proximity to a terminal assembly; (B) original equipment manufacturer; and (C) operating system.

12. The computer-implemented method of claim 1, further comprising generating, via the remote-control server, a test protocol, wherein the test run is generated from the test protocol.

13. The computer-implemented method of claim 12, wherein the test protocol is generated at least in part through selection of at least one defined data element.

14. The computer-implemented method of claim 13, wherein the at least one defined data element is automatically selected by the remote-control server.

15. The computer-implemented method of claim 13, wherein the at least one defined data element specifies a torn transaction timing.

16. The computer-implemented method of claim 12, wherein the test protocol is generated at least in part through selection of at least one independently varying data element.

17. The computer-implemented method of claim 13, wherein the test protocol is generated in part through selection of at least one independently varying data element.

18. The computer implemented method of claim 16, further comprising—
- receiving additional test results for a plurality of additional test runs generated according to the test protocol,
- automatically analyzing the test results and the additional test results to identify correlations with the independently varying data element.

19. The computer-implemented method of claim 18, wherein the automated analysis is conducted via a machine learning algorithm.

20. The computer-implemented method of claim 19, further comprising automatically generating a new test protocol based at least in part on the automated analysis.

* * * * *